(12) United States Patent
Pollock

(10) Patent No.: US 9,345,361 B2
(45) Date of Patent: May 24, 2016

(54) HEATER

(75) Inventor: James R. A. Pollock, Reading (GB)

(73) Assignee: Canland UK (Hot Pack) Ltd, Longwick (GB)

( * ) Notice: Subject to any disclaimer, the term of this patent is extended or adjusted under 35 U.S.C. 154(b) by 644 days.

(21) Appl. No.: 13/295,996

(22) Filed: Nov. 14, 2011

(65) Prior Publication Data

US 2012/0210996 A1 Aug. 23, 2012

(51) Int. Cl.
    *F24J 1/00*     (2006.01)
    *A47J 36/28*     (2006.01)
    *C09K 5/18*     (2006.01)

(52) U.S. Cl.
CPC ... *A47J 36/28* (2013.01); *C09K 5/18* (2013.01)

(58) Field of Classification Search
CPC .............................. F24J 1/00; B65D 81/3484
USPC .............................. 126/263.01, 263.05–263.1
See application file for complete search history.

(56) References Cited

U.S. PATENT DOCUMENTS

| | | | | |
|---|---|---|---|---|
| 3,461,073 A * | 8/1969 | Tinklenaugh et al. | ... | 252/182.32 |
| 3,766,079 A * | 10/1973 | Jackman et al. | ......... | 126/263.01 |
| 3,957,472 A * | 5/1976 | Donnelly | ............................ | 62/4 |
| 4,949,702 A * | 8/1990 | Suzuki et al. | ............. | 126/263.01 |
| 5,611,329 A * | 3/1997 | Lamensdorf | ............. | 126/263.07 |
| 5,935,486 A * | 8/1999 | Bell et al. | ....................... | 252/70 |
| 6,248,257 B1 * | 6/2001 | Bell et al. | ....................... | 252/70 |
| 6,289,889 B1 * | 9/2001 | Bell et al. | ................. | 126/263.07 |
| 6,484,514 B1 * | 11/2002 | Joseph et al. | ....................... | 62/4 |
| 6,569,907 B1 * | 5/2003 | Kubo et al. | ....................... | 516/4 |
| 6,644,383 B2 * | 11/2003 | Joseph et al. | ................... | 165/46 |
| 8,506,539 B2 * | 8/2013 | Guillon et al. | ............... | 604/294 |
| 8,635,998 B2 * | 1/2014 | Madan et al. | ........... | 126/263.07 |
| 2003/0000517 A1* | 1/2003 | Joseph et al. | ........... | 126/263.06 |
| 2006/0005827 A1* | 1/2006 | Consoli et al. | .......... | 126/263.06 |
| 2008/0099182 A1* | 5/2008 | Bham et al. | ..................... | 165/61 |
| 2009/0065733 A1* | 3/2009 | Handa et al. | .................... | 252/71 |
| 2010/0300426 A1* | 12/2010 | Madan et al. | ........... | 126/263.07 |
| 2012/0006314 A1* | 1/2012 | Sunol et al. | ............... | 126/263.09 |
| 2012/0186141 A1* | 7/2012 | Young | ............................. | 44/253 |
| 2013/0119301 A1* | 5/2013 | Sunol et al. | ..................... | 252/76 |
| 2014/0058340 A1* | 2/2014 | Guillon et al. | ............... | 604/290 |
| 2014/0142668 A1* | 5/2014 | Guillon et al. | ............... | 607/112 |

FOREIGN PATENT DOCUMENTS

JP     2008013739 A    *    1/2008

* cited by examiner

*Primary Examiner* — Jorge Pereiro
(74) *Attorney, Agent, or Firm* — Galvin Patent Law LLC; Brian R. Galvin

(57) ABSTRACT

The present invention relates to flameless heating apparatus for food products. In particular, it relates to an improved potentially exothermic mixture/blend for such heaters and to meal packages including foods and heating apparatus. An embodiment of the invention comprises a composite material consisting of a potentially exothermic metallic alloy powder dispersed throughout a porous polyethylene matrix, which releases hydrogen in an exothermic reaction. The present invention seeks to reduce the production of such gas per unit mass, and further seeks to improve the efficiency of the reaction.

6 Claims, 6 Drawing Sheets

HEATER

CROSS-REFERENCE TO RELATED APPLICATIONS

The present invention claims priority to patent application serial number GB1019094.0, titled "HEATER", and filed in the UK IPO on Nov. 11, 2010, the entirety of which is hereby incorporated by reference.

FIELD OF THE INVENTION

The present invention relates to flameless heater and heating apparatus for food products. In particular, but not necessarily restricted thereto, the present invention relates to improved exothermic mixtures.

BACKGROUND OF THE INVENTION

It is known to have food products such as rations for backpacker, adventurers and military forces which comprise sealed packages of food. Conveniently, the food is hermetically sealed, within a vacuum; the food can be heated, on demand, since the food will already have been cooked. Such food products and apparatus are collectively referred to as Meals-Ready-to-Eat ("MRE"). In addition to the above uses, the products can be used as emergency rations for shelters and for heating of non-food products. Some of these meals are claimed to have a shelf life of 18-36 or more years from production. Typically food sachets are provided on a personal basis, since heat transfer issues may arise in larger packages. Food is heated to a sufficient temperature—around 70° C. or more—to make it a more pleasurable experience, compared with eating such food cold, which can incidentally, be done having already been cooked. Furthermore, there is a danger of burning when the outer wall of the exothermic material storage portion is not sufficiently thermally insulated. Accordingly such foods are typically prepared by heating with a flameless heater, frequently referred to as a flameless ration heater.

A flameless ration heater, or FRH, is a water-activated exothermic chemical heater included with Meals, Ready-to-Eat (MREs), used to heat the food. US military specifications for the heater require that it be capable of raising the temperature of a 250 gramme entree by 40° C. in twelve minutes, and that it displays no visible flame. A typical flameless exothermic chemical reaction works by an oxidation-reduction process, similar to the process of rusting metals—only far quicker. In the case of the flameless ration heater, one metal that can be used is magnesium. Magnesium is frequently chosen because it is readily oxidized and is mixed together with a small amount of iron in a pouch. To activate the reaction, a small amount of water is added, and the boiling point of water is quickly reached as the reaction proceeds. The iron plays a catalytic role in the heater mix $Mg+2H_2O \rightarrow Mg(OH)_2+H_2$. Salt water can be added to this composition.

The idea behind a flameless heater is to use the oxidation of a metal to generate heat. One type of flameless heater comprises magnesium dust which is mixed with salt and a little iron dust in a thin, flexible pad about the size of a playing card. To activate a flameless heater, water would be added. Within seconds of the addition of water, a typical flameless heater reaches the boiling point and is bubbling and steaming. To heat a meal in an MRE package, the emergency services personnel/explorer/soldier simply inserts the heater and the MRE pouch back in the box that the pouch came in. Ten minutes later, dinner can be served—typically from the same container in which the product was heated. Calcium oxide is another material commonly used in the manufacture of exothermic mixtures for MRE compositions, which is mixed together with sodium carbonate and aluminium.

FRH packages are quite expensive to produce and necessarily do not provide sustained heating effects. Additionally, the packages need to be transported with care and limitations are often provided when there is a high ambient humidity.

BRIEF SUMMARY OF THE INVENTION

The present invention seeks to provide a solution to the above problems. The present invention seeks to provide a heater package operable to provide a controlled exothermic reaction upon the addition of water and to an improved exothermic composition for heating meals and the like.

The present invention further seeks to provide a self-heating meal module as described above which is designed to exhibit sufficient heat transfer efficiency as compared to that typically exhibited by existing self-heating meal modules whilst reducing any perceived dangers associated with transportation and storage under inclement conditions.

In accordance with a first aspect of the invention, there is provided a heat source comprising a retaining sachet permeable to water comprising a powdered exothermic composition and a powdered inert composition, the inert composition comprising between 15 and 80% by mass of the total powder mass, wherein upon the addition of water, said exothermic composition being operable to react exothermically with a metal; wherein the inert composition increases thermal capacity and reduces the effective surface area of the exothermic composition. The bulking material readily absorbs the reaction heat and enables heat exchange with the water and food to be heated over a longer period of time, enabling the reaction to be more controlled than has previously been possible. Water is added at least in appropriate molar quantities. It has been found that having the bulking agent being present, the efficiency of the reaction is improved, with a controlled release of energy, over longer period of time. Indeed the results are further improved within the range 30%-60%.

It has been found that a 50% exothermic material to 50% bulking material composition can provide a more uniform heat transfer of heat energy to the product to be heated. It is believed that less thermal energy is wasted through the unnecessary overheating of water into steam, the energy being maintained at a reduced high temperature for longer.

Conveniently, the heat source is a powdered exothermic composition comprising calcium oxide, sodium carbonate and a metal. The metal can be selected from one or more of the following metals; aluminium, iron, zinc and magnesium. Alternatively, the heat source is a powdered exothermic composition comprising magnesium-iron alloy, sodium chloride and anti-foaming agents. Conveniently, the bulking material is selected from one of sand or clay, such as silica and insoluble silicates.

The heat source can be conveniently packaged with the powders separately contained so that it can be used for personal heating applications, such as in warming foods and in meals ready to eat applications, whilst these packages are more voluminous, a preferred composition comprises 50% exothermic powder and 50% stabilising bulking powder, is effectively twice as voluminous.

An advantage of the present invention is that, in use for example in MRE applications, the reduction in the units of hydrogen gas production per unit mass greatly increases safety in transportation and use, whilst simultaneously assisting heating by enabling the thermal mass of the bulking powder to reduce the amount of vaporised water being produced and, by way of the heating powders having a greater thermal capacity, extending the duration of heating. Indeed, it is possible to reduce the amount of exothermic powder present to achieve the same heating effect through the use of the bulking powders. In military operations the production of explosive gases is never welcome. Conveniently the bulking agents are desiccants, such as silica gel. Another useful bulking powder is kieselgur, which comprises a fine powder. In transportation of the product the presence of anhydrous bulking agents means that in the event of accidental wetting of the powders, the anhydrous compounds will absorb any wetting preferentially to the reactive powders. Similarly, dried clay or talcum powders can be used.

In accordance with a third aspect of the invention there is provided a meal-ready-to-eat package including a potentially exothermic powder, a container and a sealed meal packet; in use water is added to the potentially exothermic mixture within the container.

By the provision of the present composition, the problems associated with the presence of high ambient humidity are reduced, as are problems which may be encountered by improper handling. Indeed, there is a significant reduction in the amount of hydrogen gas produced per unit mass of powder; not only can this reduce the severity/occurrence of potential hazards, it can also assist in heat transfer, by increasing the reaction time by virtue of the improving thermal contact with the food bag to be heated.

BRIEF DESCRIPTION OF THE DRAWINGS

Some preferred embodiments of the invention will now be described, by way of example, with reference to the accompanying drawings, of which.

DETAILED DESCRIPTION OF THE INVENTION

There will now be described, by way of example only, a preferred embodiment of the invention. In the following description, numerous specific details are set out in order to provide a complete understanding to the present invention. It will be apparent to those skilled in the art, that the present invention may be put into practice with variations of the specific.

The present invention can conveniently be described with reference to a Hot Pack™ flameless heater for food, with references to FIGS. 1-6, following a simple explanation of the overall processes involved. Generally, the invention resides in the provision of a reactive powdered mass which produces a reduced hydrogen output per unit mass, which powdered mass can maintain the temperature of a meal package over a longer period of time.

Figure 1:
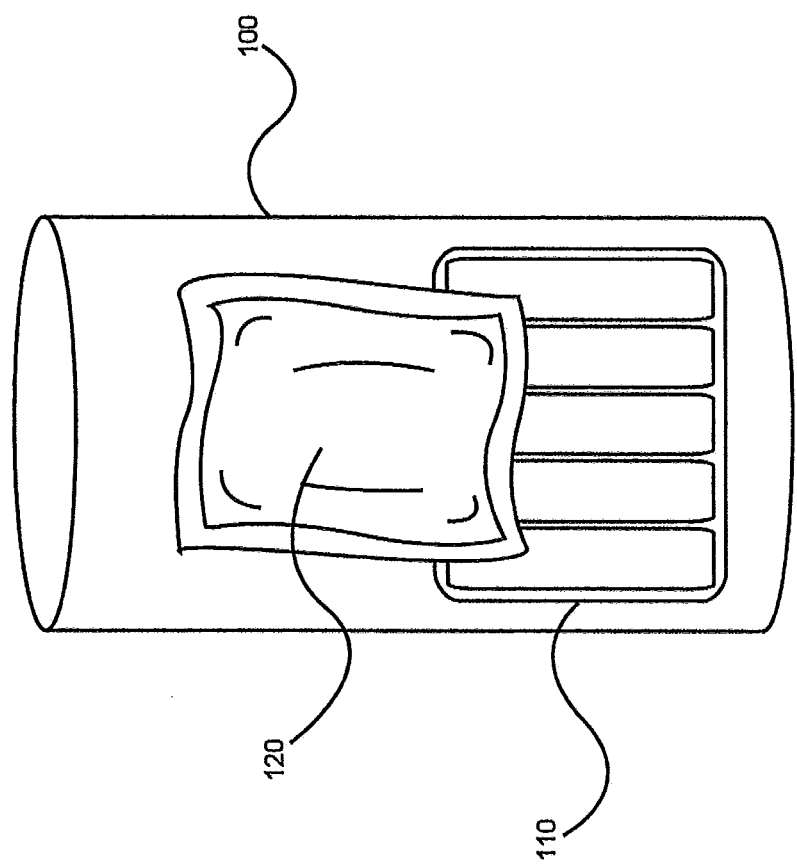
FIG. 1 shows an embodiment of a meal-ready-to-eat package.
Figure 2:
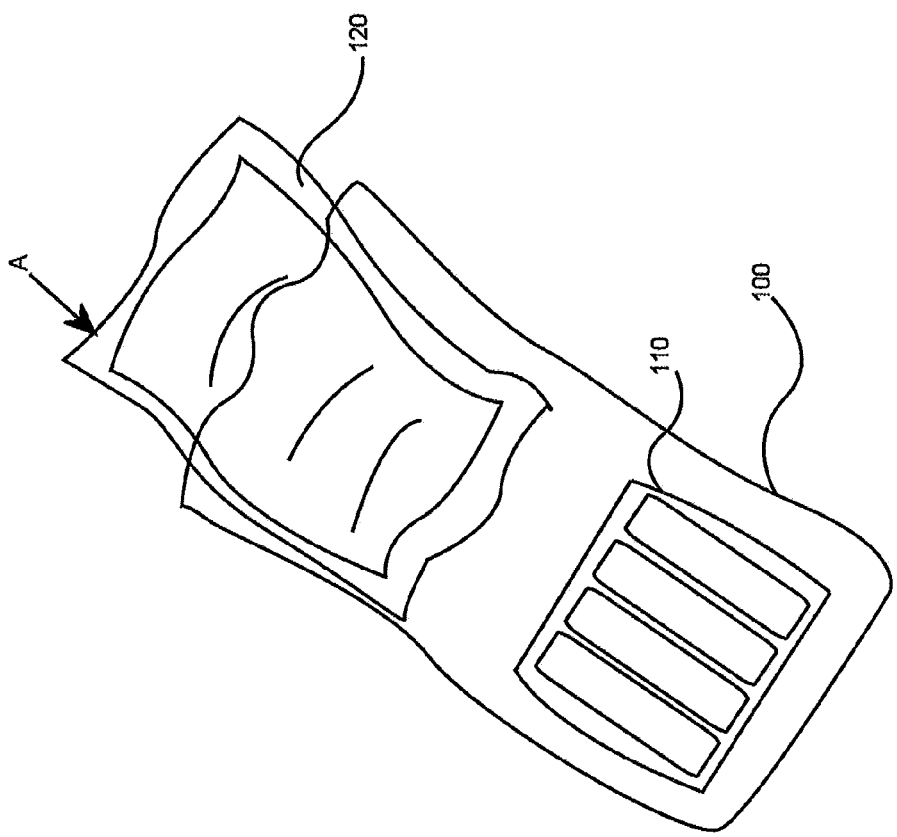
FIG. 2 shows an embodiment of a bag being inserted into a heater package, according to an embodiment of the invention.

FIG. 1 shows a sealed pack 2 comprising an exemplary heater bag 4, which is conveniently a generally elongate bag, extending more in length than it does in width: it has been found that dimension of 20 cm×32 cm are convenient for many food applications, although it will be appreciated that this size is not the only size which is suitable. Conveniently the potentially exothermic reaction mixture is provided in reaction bags 4 analogous to tea bags, whereby water which is present in the heater bag can percolate through the reaction bags relatively freely. Conveniently, there are sufficient reaction bags so as to lie against each side of food bag 6 placed inside the heater bag should be retained within the outer plastic bag for a predetermined period, whereby to maximise the transfer of heat.

Figure 3:
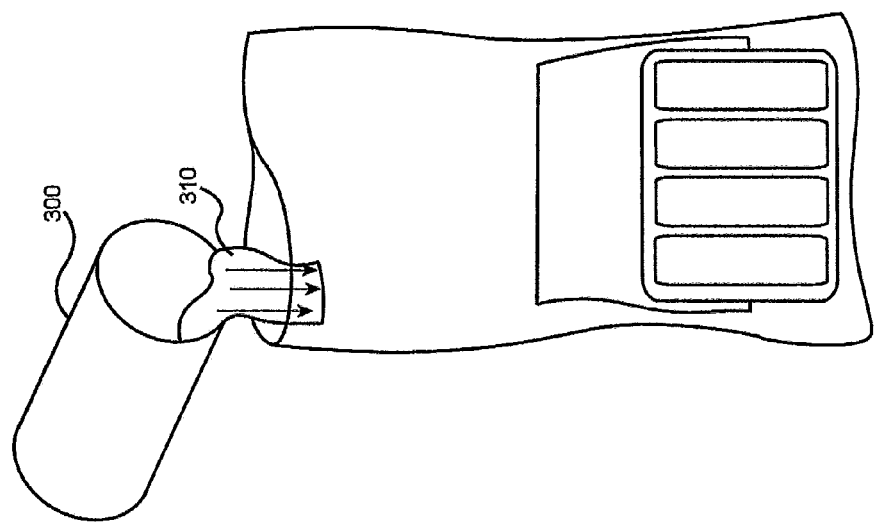
FIG. 3 shows water being added to a mixture comprising a heater package, according to an embodiment of the invention.
Figure 4:
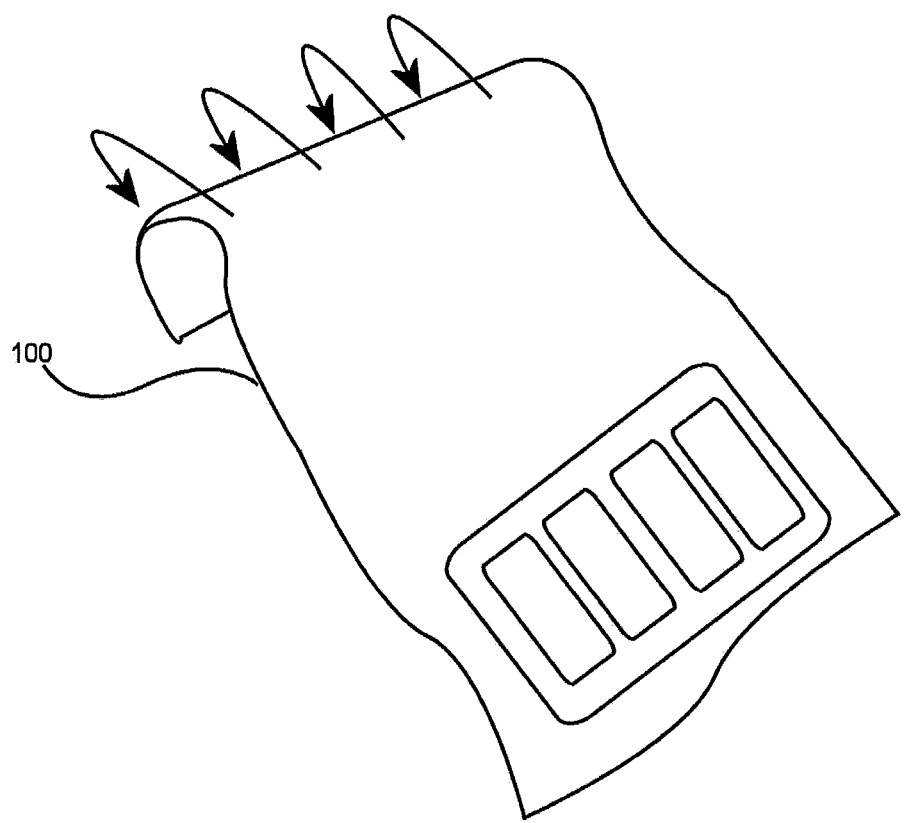
FIG. 4 shows a bag being folded over to assist in retaining heat within a bag, according to an embodiment of the invention.
Figure 5:
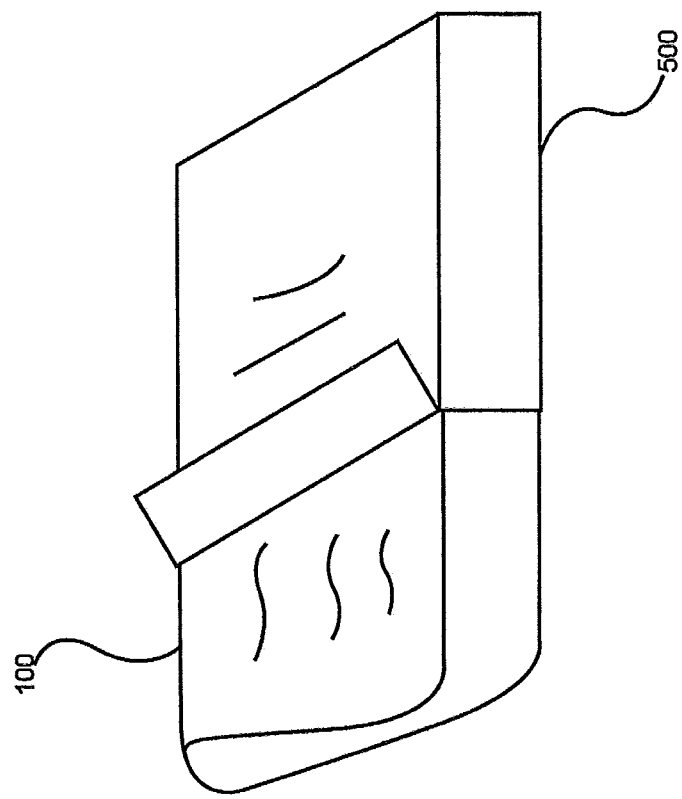
FIG. 5 illustrates an embodiment of the invention in which a first bag is inserted into a second bag.
Figure 6:
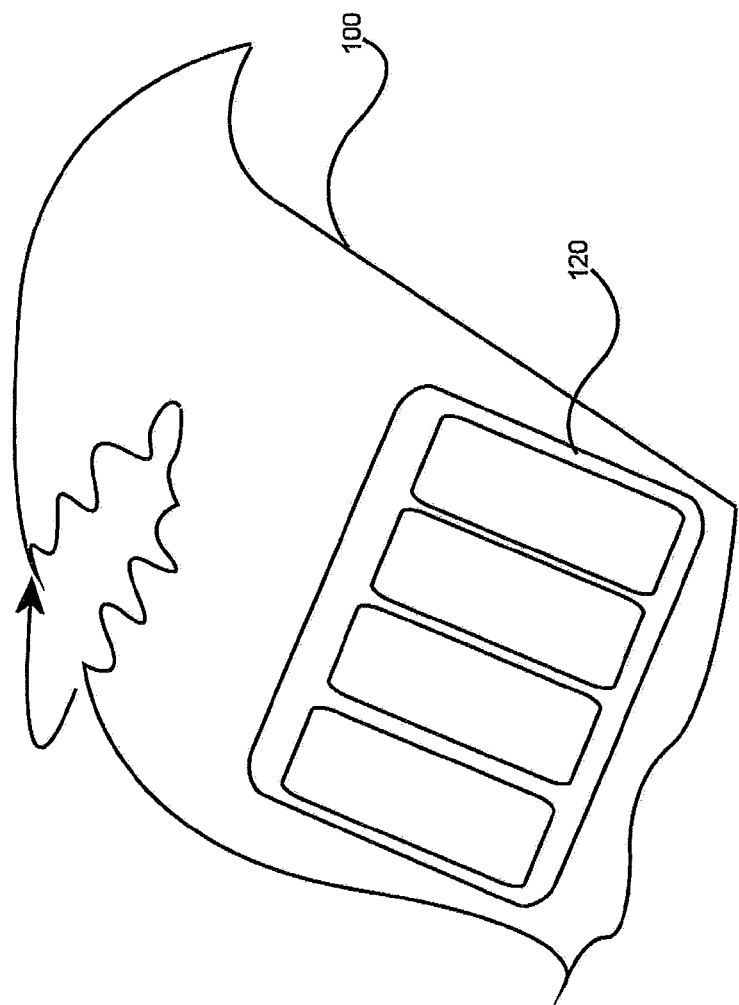
FIG. 6 illustrates how to open a heater bag once an exothermic reaction has occurred within a bag, according to an embodiment of the invention.

In use, the sealed pack is opened along one short edge: a sealed packet of reheatable food is inserted 9 into bag 2 (FIG. 2); water 10 is added 11 to the mixture in a predefined amount: conveniently this is about 45 ml, but obviously depends upon the amount of powdered composition (FIG. 3). The bag is approximately just over twice the length of the packet of food; the remainder of the plastic bag is folded over so as to assist in retaining heat developed within the bag (FIG. 4). Heat retention may be further assisted by placement within a further bag or envelope 12 (FIG. 5). Many meals are ready after having been heated for a period of 10-12 minutes. This period of time will typically be the same in a range of food products to ensure that foods are properly heated ordinarily—otherwise overcooking and undercooking of products will result, sometimes with dietary problems arising, so uniformity of cooking periods is preferable. Once ready, the bag can be torn along a predefined line (FIG. 6) or the bag may be inverted to allow the food bag to slip out through the opening of the bag, taking into account that the bag may distort to a certain extent due to heat generation.

Applicants have determined, through experiment, that gaseous escape of hydrogen not only is potentially dangerous, but also loses a disproportionate amount of heat. By the addition of powdered desiccants to powdered exothermic material several unexpected effects have been observed. Firstly, the amount of exothermic material required can be reduced to a small degree. In particular, this is believed to occur in view of the fact that the efficiency of the heat transfer process is improved. The powders are conveniently retained within an absorbent pouch and so the powders are retained within a small volume which provides a first advantageous effect in that the rate of emission of heat other than to the food is slowed, thereby providing a more effective heat transfer to the food whilst a secondary effect is that the thermal capacity is increased, contributing to the safety advantage. The heating, being more effective and lasting longer, provides a safer environment in use; there is a reduction in the emission of hot gases escaping from a pouch/container and therefore less dangerous than would be otherwise the case.

Conveniently the bulking powder is a desiccant such as silica gel which, in powder form, can easily be handled and provides an advantage in that it will preferably absorb moisture and condensation, whereby to protect the reactants from atmospheric moisture Applicants have found that it is possible to reduce the mass of exothermic material by the introductions of inert packing material, such as dried silica gel. Other compounds such as magnesium silicate (commonly referred to as talc or talcum powder), kieselgur, sands and clays can provide similar results. In particular, for example with kieselgur, a powder or substance that can easily be crumbled into a fine white to off-white powder is ideal. Particle sizes ranging from less than 1 micron to more than 1 millimeter are possible, but typically 10 to 200 microns.

These types of powder are not dense, due to a high porosity. The typical chemical composition of oven dried kieselgur is 80 to 90% silica, with 2 to 4% alumina (attributed mostly to clay minerals) and 0.5 to 2% iron oxide. Similarly, dried clay powders can be used. An advantage of such anhydrous bulking agents arises in the transportation thereof, where the presence of anhydrous bulking agents means that in the event of accidental wetting of the powders, the anhydrous compounds will absorb any wetting preferentially to the reactive powders.

Tests have been performed both with individual Meals, Ready-to-Eat containing flameless heaters in a laboratory environment to examine their efficiency. Temperature increases in excess of 40° C. are provided for 10-12 minutes. It is evident from the tests performed that the release of hydrogen gas from these flameless ration heaters is well below limits placed upon the movement of goods in accordance with national and international standards.

Specifically, the tests were performed both with individual exothermic heaters comprising different compositions:

| Exothermic composition/ inert powder | Total mass | Total heat production |
| --- | --- | --- |
| 20 g/0 g | 20 g | 38 Kcal |
| 20 g/20 g | 40 g | 38 Kcal |
| 20 g/15 g | 35 g | 37 Kcal |

The results show that the addition of an inert powder can enable a reduction in the output of hydrogen per unit mass of heating composition.

The inert composition can comprise between 15% and 80% by mass of the total powder mass, wherein upon the addition of water, said exothermic composition being operable to react exothermically with a metal; wherein the inert composition increases the thermal capacity of the heating composition and reduces the effective surface area of the composition. The amount of water will be provided in an appropriate molar concentration for the exothermic reaction to take place and to provide sufficient wetting of the non-reactive powder to assist in thermal transfer and provide thermal mass. It has been found that at least 35 ml of water is suitable to be added to an exothermic powder of 20 g in weight. The results are further improved with the inert composition comprising between 30%-60% of the total mass. Preferred results have been provided by a 50% exothermic material to 50% bulking material composition. The bulking material readily absorbs the reaction heat and enables heat exchange with the water and food to be heated over a longer period of time, enabling the reaction to be more controlled than has previously been possible.

In recent years, flameless rations heaters, despite being flameless have been known to pose certain fire, explosion, and health-related safety issues while in shipment where typically hundreds of these meals are packaged together in a single shipping container. The present invention significantly reduces the potential hazard associated with the transport of these flameless ration heaters in restricted space environment such as aircraft. Similarly, storage and use in operational circumstances where the escape of hot gases occurs in a restricted environment means that such heaters can be employed, when otherwise they would have been considered out of bounds.

Whilst magnesium-iron heating packages for MREs can typically produce over 300 calories per gram, other commercial heat engines for self-heating food packaging exist. In a magnesium-iron heater, water must be used to activate the heater, which generates hydrogen as a by-product. Other commercially available heat engines exist, for example, those which involve an exothermic reaction between quicklime (calcium oxide) and water.

It is to be understood that the present invention is not restricted to meals-ready-to-eat since the term MRE is generally employed in relation to specific types of heating food in certain types of food heating packages. Equally, it is possible to use the present invention in larger prepared food arrangements, suitable for providing heat whereby to cook food and for meals other than for one person. It is noted, however, that many foods for outdoor use are already cooked and merely require heating—that is to say the temperature achieved in heating is not critical, for example when re-heating food that has already been cooked and has been exposed to the air.

The invention claimed is:

1. A Meal-Ready-to-Eat (MRE) heat source comprising a retaining sachet permeable to water comprising a non-hygroscopic mixture of powdered exothermic composition and a powdered inert bulking composition,
    the powdered exothermic composition including aluminum metal, the inert composition comprising between 15%-80% by mass of the total powder mass,
    wherein upon the addition of liquid water, said liquid water reacts exothermically with the metal,
    wherein the inert bulking composition comprises one or more of the following: magnesium silicate, kieselgur, sands and clays;
    wherein the inert bulking composition provides additional volume and assists in the dissemination of heat.

2. A heat source according to claim 1, wherein the inert composition comprises between 30%-60% by mass of the total powder mass.

3. A heat source according to claim 1, wherein the exothermic composition and the inert powder are provided in equal quantity by mass.

4. A heat source according to claim 1, wherein the heat source is packaged with the powders contained in a sealed container.

5. A heat source according to claim 1, wherein the powdered exothermic composition comprises calcium oxide, sodium carbonate and aluminum.

6. A heat source according to claim 1, wherein the powdered exothermic composition further comprises anti-foaming agents.

* * * * *